(12) United States Patent
Ness

(10) Patent No.: US 6,550,698 B2
(45) Date of Patent: Apr. 22, 2003

(54) NOZZLE VALVE

(75) Inventor: Friedrich Ness, Dachsbach (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 09/971,199

(22) Filed: Oct. 4, 2001

(65) Prior Publication Data

US 2002/0014543 A1 Feb. 7, 2002

Related U.S. Application Data

(63) Continuation of application No. 09/648,340, filed on Aug. 25, 2000, now abandoned.

(30) Foreign Application Priority Data

Sep. 11, 1999 (DE) .......................................... 199 43 516

(51) Int. Cl.$^7$ ................................................ B05B 1/30
(52) U.S. Cl. ........................ 239/571; 239/569; 239/570; 239/132; 239/533.1
(58) Field of Search ................................ 239/132, 452, 239/453, 456, 459, 460, 533.1, 533.15, 569, 570, 571, 541, 584

(56) References Cited

U.S. PATENT DOCUMENTS

| | | | | |
|---|---|---|---|---|
| 1,564,507 A | * | 12/1925 | Barker | |
| 3,149,697 A | * | 9/1964 | Bendeich et al. | |
| 3,221,718 A | * | 12/1965 | Isley | |
| 3,542,155 A | * | 11/1970 | Kern et al. | |
| 3,725,990 A | * | 4/1973 | Petersen et al. | |
| 3,894,556 A | * | 7/1975 | Pareja | 137/539 |
| 4,347,915 A | * | 9/1982 | Cooper | 137/539 |
| 4,365,648 A | * | 12/1982 | Grothe | |
| 4,700,741 A | * | 10/1987 | Murphy | 137/539 |
| 4,893,650 A | * | 1/1990 | Chisholm et al. | |
| 5,404,904 A | * | 4/1995 | Glaser | |
| 5,915,345 A | * | 6/1999 | Kling et al. | 123/41.35 |
| 6,244,295 B1 | * | 6/2001 | Bartussek et al. | |

* cited by examiner

Primary Examiner—Robin O. Evans
(74) Attorney, Agent, or Firm—Kolpe and Koenig, P.C.

(57) ABSTRACT

A simply constructed and easy-to-produce nozzle valve (1) for oil spraying of pistons in internal combustion engines is provided. The nozzle valve (1) is formed from a thin-walled sheet-metal housing (2), a nozzle (12), a valve body (8), and spring means (10) for the valve body (8). The spring means (10) act at one end directly against the valve body (8) and rest at their other end against a support (11) extending within the housing (2). This support (11) forms a single structural unit together with the nozzle (12).

8 Claims, 2 Drawing Sheets

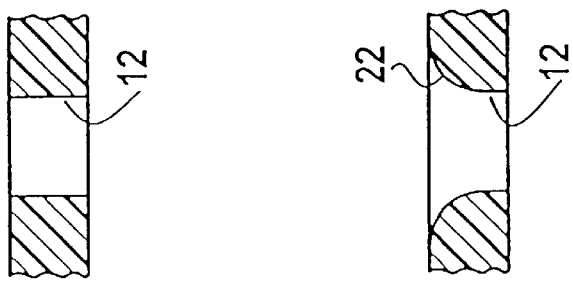
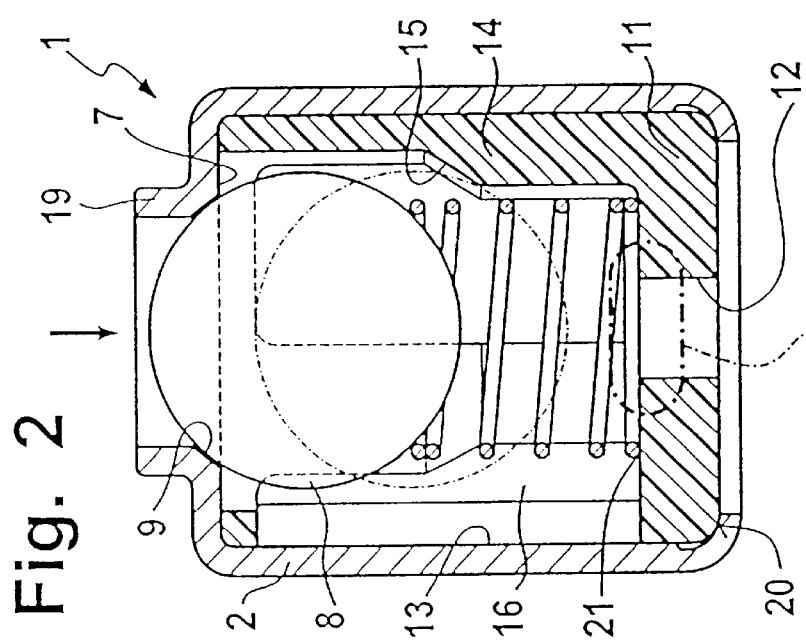
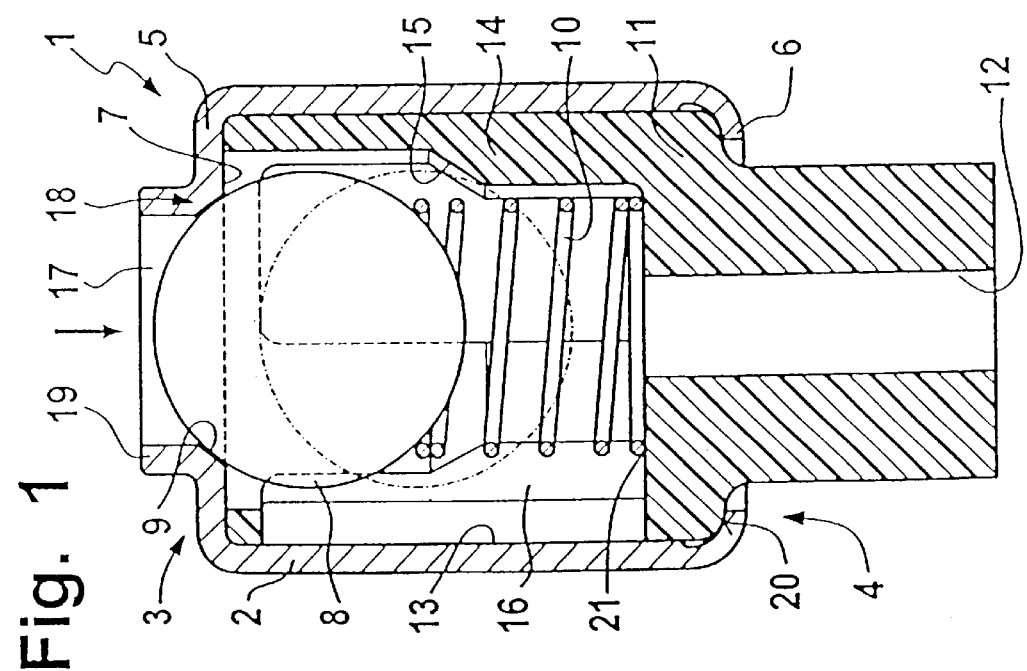

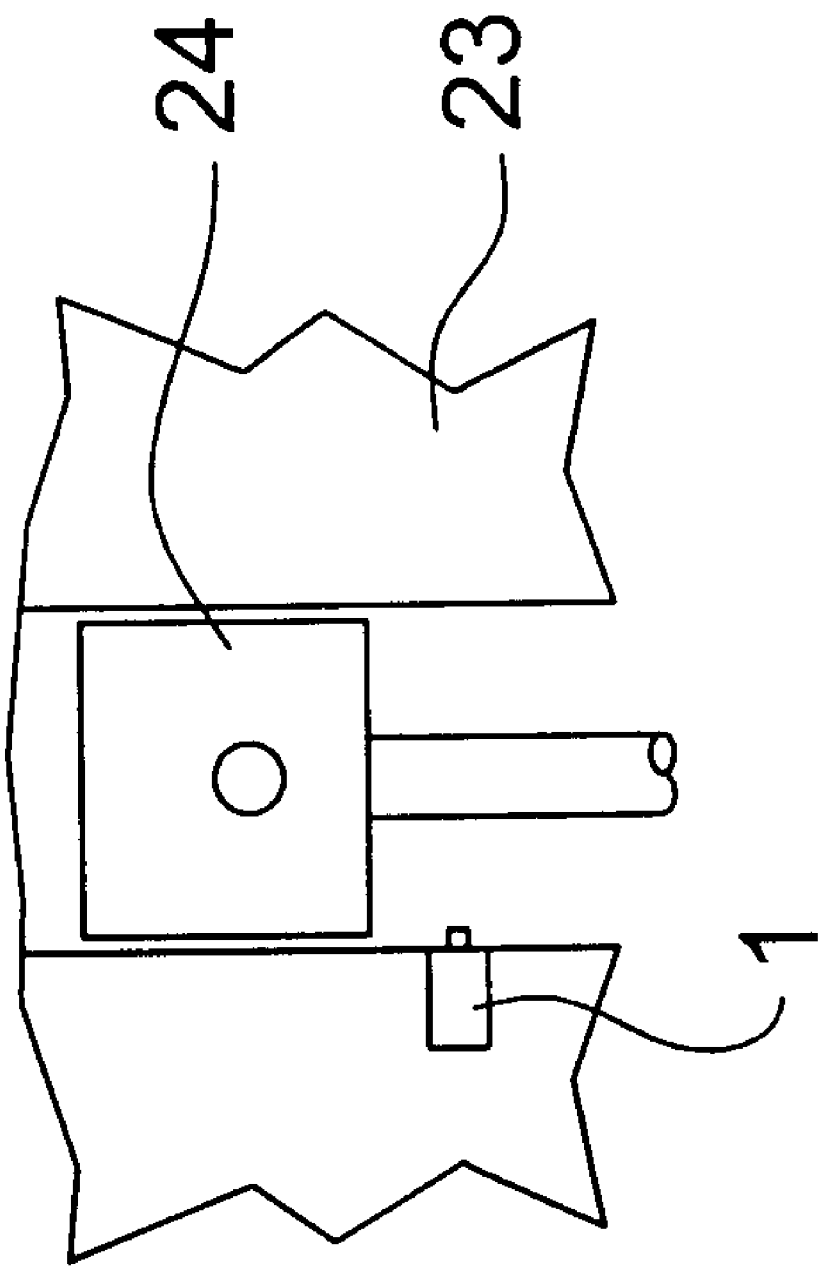

NOZZLE VALVE

CROSS-REFERENCE TO RELATED APPLICATIONS

The present application is a continuation of U.S. patent application Ser. No. 09/648,340, filed Aug. 25, 2000 now abandoned.

BACKGROUND

The present invention concerns a nozzle valve for spraying of machine parts, especially for oil cooling of pistons in internal combustion engines, from a housing, a nozzle, a valve body such as a ball, and at least one spring means such as a coil spring. The housing includes an inlet for the oil which is positioned behind the valve body. The valve body is loaded by the spring means directly supported thereon counter to the flow-through direction of the oil in the direction toward a valve seat at the inlet. The spring means lies against a support on the side facing away from the valve body.

Such a nozzle valve, i.e., a structural unit consisting of a spring-loaded flow-through valve with a following nozzle, is known from EP 0 346 264 A2, which is considered as defining the type. This includes sheet-metal elements assembled in sandwich fashion, between which the nozzle is formed. In this state of the art, the valve is articulated orthogonally to the nozzle and is produced by shaping one of the upper sheet-metal elements.

A disadvantage of this known nozzle valve is the fact that it has a relatively complicated design. Forming the nozzle by shaping the sheet-metal elements has also proven to be relatively problematic. The spray stream can be adjusted only with difficulty. Moreover, it must be remembered that the nozzle valve consists of relatively many parts, increasing production costs. In addition, the sandwich-like mode of construction is accompanied by limitations with respect to the point of installation of the nozzle valve. Thus, due to its length, such a valve can only be installed laterally on the crankcase or cylinder head of the internal combustion engine. Installation in a connecting rod, a connecting-rod eye, or a rod bearing is out of the question.

SUMMARY

The object of the present invention is therefore to create a nozzle valve of the above-mentioned type in which the cited disadvantages are eliminated. In particular, it should be formed from only very few parts and be simple to produce.

This goal is attained by providing both end walls of the housing with a collar directed radially inwardly. The valve seat is formed by an inner surface of the first collar and a separately produced support resting on an inner surface of a second collar, with this support being formed as one piece with the nozzle.

Through this improvement according to the present invention, a nozzle valve is created which is very simple to manufacture and which includes only a few parts. Its housing should preferably be formed of a thin-walled material, such as deep-drawn sheet metal. However, it can also be manufactured via a machining process. The housing can likewise be manufactured in principle from a material for light construction such as a polymeric material. It is further conceivable to forgo the housing completely as a structural element. The structural parts including the nozzle with valve body and the spring means are then positioned directly in a cavity of the internal combustion engine. This cavity or the cavity for the nozzle valve with housing can range, for example, within a connecting rod, a connecting-rod eye, a wall of a cylinder head, or a wall of a crankcase of the internal combustion engine. It is also conceivable to position this cavity in the cap of a rod bearing, which cap is bolted in place as a rule.

As a result of the proposed one-piece design of the nozzle with the support for the spring, with simultaneous direct support of the other side of the spring against the valve body, the nozzle valve exhibits only a small number of structural parts. It is simultaneously very compact. A ball is preferably employed as the valve body. However, it is also conceivable to form the valve as a disk valve or the like. The coil spring can also be formed as a spiral or plate spring.

A nozzle valve having an especially short design if, following a further refinement of the present invention, the support with nozzle extends completely within the housing. This precise design is suitable for applications of the nozzle valve in cramped areas.

The spring means is adapted such that the valve body keeps the nozzle valve closed with no or only slight oil pressure. In this way, undesired cooling of the corresponding piston is avoided at a lower rpm range of the internal combustion engine and therefore at a lower output of the oil pump. As is known, cooling of the piston is desired only at higher rpm and load conditions of the internal combustion engine. Thus, at lower rpm of the internal combustion engine, the full oil pressure in the lubricating-oil circuit is available for lubrication of the known bearing points.

It can also be advantageous to have the support with nozzle protrude tubularly beyond the second collar. In this way, the oil can be sprayed while being particularly directed toward the piston to be cooled. The nozzle can be constructed better with respect to its characteristic performance curve, i.e., substantially loss-free conversion of pressure energy into kinetic energy.

According to a further subclaim, the support with nozzle is provided with an annular projection extending along the inner surface of the housing. This annular projection, on the one hand, stabilizes the entire nozzle valve. On the other hand, it is possible through this projection to form a stop for the valve body in the opening direction, against which the valve body permanently rests beginning at a certain pressure of the oil at the inlet. Passage of the oil occurs via defined cross-sections such as segment-like openings or longitudinal recesses in the annular projection or, upon "free flight" of the valve body, only between the latter's outer surface and the housing.

It is particularly favorable with respect to manufacturing engineering if the support with nozzle is manufactured from a material for light construction such as plastic. Both structural parts should preferably be produced as one piece. Simple injection molding is suitable here.

According to a further refinement of the present invention, the first collar is transformed at its inner edge into an axial ring, such that a simply formed valve seat is created for the valve body in its closed position. One can thus forgo the need for a subsequently applied valve seat ring or the like.

Finally, further embodiments of the present invention concern the formation of the nozzle. Thus, a mouth of the nozzle positioned on the side of the inlet can be provided with a conical or rounded-off or even beveled edge. The person of skill in this field will be able to determine which nozzle design is the most appropriate for a particular application.

One use of the nozzle valve according to the present invention relates particularly to the spraying of pistons in internal combustion engines, but the range of protection of this invention is not limited only to this application. Many other applications are envisioned, such as in machine construction or elsewhere in which the proposed simply constructed nozzle valve can be used for spraying with a liquid medium.

BRIEF DESCRIPTION OF THE DRAWINGS

The present invention is explained in more detail using the drawings. These include:

FIG. 1 is a longitudinal section through a first embodiment of a nozzle valve with a support and nozzle protruding tubularly beyond the second collar;

FIG. 2 is an embodiment similar to that revealed in FIG. 1, but with support and nozzle located completely within the housing;

FIG. 3 is an enlarged detail of the area indicated with an X in FIG. 2;

FIG. 4 is an enlarged detail of an alternate configuration of the area indicated with an X in FIG. 2; and FIG. 5 is an enlarged detail of a second alternate configuration of the area indicated with an X in FIG. 2.

FIG. 6 is an elevational view, partially in cross-section, of a nozzle valve of the present invention installed in an internal combustion engine for oil cooling of pistons.

DETAILED DESCRIPTION OF THE PREFERRED EMBODIMENTS

FIGS. 1 and 2 show a nozzle valve 1 according to the present invention, which serves here in oil spraying and cooling of pistons in internal combustion engines. The nozzle valve 1 includes a thin-walled housing 2 of a sheet-metal material. The housing 2 has a sleeve-like geometry. End walls 3,4 of the housing 2 each possess an inwardly flanged collar 5,6. A valve body 8 is spring-loaded against an inner surface 7 of the first collar 5. This valve body 8 is formed here as a ball. The inner surface 7 forms a valve seat 9 for the valve body 8.

Spring means 10 for loading the valve body 8 extend within the housing 2 and are supported on an end facing away from valve body 8 on a support 11. The support 11 is formed here of plastic and is formed as one piece with a nozzle 12. According to FIG. 1, the nozzle 12 protrudes in tube form beyond the second collar 6. According to FIG. 2, the nozzle 12 is located completely within housing 2.

The support 11 with the nozzle 12 has an annular projection 14 extending along the inner surface 13 of the housing 2. This annular projection 14 appropriately extends over the entire length of the sleeve-shaped housing 2. The annular projection 14 has an additional valve seat 15 lying opposite to the valve seat 9 in the opening direction and formed here as a conical seat. The valve body 8, under the action of oil pressure, finds a resting point on this additional valve seat 15.

At the same time, FIGS. 1,2 reveal that the annular projection 14 possesses longitudinally extending segment-like openings 16. With the valve body 8 in the resting position, the oil is directed via these openings 16 past this additional valve seat 15 to nozzle 12.

In the area of an inlet 17 for the oil into nozzle valve 1, the first collar 5 is transformed at its inner edge 18 into an axial ring 19. This axial ring 19 extends against the flow direction of the oil, which is indicated by the arrow. Thus, the valve seat 9 is realized on the inner surface 7 of housing 2 by an edge area between the first collar 5 and axial ring 19.

As is clear, moreover, from FIGS. 1,2, the support 11 with the nozzle 12 is axially supported in the area of the second collar 6 against an inner surface 20 of the second collar 6. The spring means 10 extend with the side 21 facing away from the valve body 8 directly onto the support 11. No further structural member besides the spring means 10 is positioned between the valve body 8 and the support 11. In this arrangement, a separate slide or the like for spring means 10 is foregone.

The nozzle valve 1 proposed according to the present invention can be installed, for example, in a connecting rod or connecting-rod eye of an internal combustion engine. However, it is also conceivable to install the nozzle valve 1 in a cylinder-head or crankcase recess. It is likewise conceivable to position the nozzle valve 1 on a cap of a rod bearing with the spray direction toward the bottom of the corresponding piston. The nozzle valve 1 can be supplied with oil via the lubricating-oil circuit of the internal combustion engine.

The valve body 8 of nozzle valve 1 opens beginning at a certain oil pressure. This pressure is usually attained first at medium to higher speeds of rotation of the internal combustion engine and thus at higher output of the oil pump. Upon overcoming the closing force of spring means 10, the valve body 8 is moved in the direction toward the nozzle 12 and comes to rest on the additional valve seat 15. The oil can thus be conveyed over the outer surface of the valve body 8 through the openings 16 in the direction of the nozzle 12. This nozzle 12 can include, for example, a bevelled inlet area according to FIG. 3. However, nozzle 12 can also have a rounded-off form at its mouth 22 on the inlet side, as shown in FIG. 4. The person skilled in the art will optimize the nozzle depending on the specific application.

Alternatively, as shown in FIG. 5, the mouth 22 of the nozzle 12 may also be conical, such that it is tapered conically in the flow-through direction.

Viewed overall, a nozzle valve is thus proposed which is extremely simple to produce and includes only a few structural parts.

As shown in FIG. 6, the nozzle valve 1 may be mounted in an internal combustion engine 23 with the spray nozzle being directed toward the piston 24. This cools the piston 24 with oil at high engine rpm's.

ELEMENTS 1 nozzle valve
2 housing
3 end wall
4 end wall
5 first collar
6 second collar
7 inner surface
8 valve body
9 valve seat
10 spring means
11 support
12 nozzle
13 inner surface
14 annular projection
15 valve seat
16 opening
17 inlet
18 inner edge 19 axial ring
20 inner surface
21 side
22 mouth

What is claimed is:

1. A nozzle spray valve for oil cooling of pistons in an internal combustion engine, comprising:

a one-piece housing manufactured from a deep drawn thin-walled material defining an interior cavity, the housing having an external surface, an internal surface, and first and second end walls, the first end wall having a first, radially inwardly directed collar with an inner surface which forms a first valve seat, the second end wall having a second, radially inwardly directed collar with an inner surface, the collars being produced by flanging inwardly at approximately right angles from a generally sleeve-shaped sidewall, a valve body positioned in the interior cavity, and a spring positioned between the valve body and a support located on the inner surface of the second collar such that the valve body is biased to a closed position against the first valve seat against a flow-through direction of the valve, the support being formed as one piece with a spray nozzle, the support is formed of plastic and includes an annular projection extending along the internal surface of housing, the annular projection has a second valve seat formed in an opening direction of the valve body, the annular projection including longitudinally extending segment-like openings or longitudinal recesses which extend at least over a majority of a length of the annular projection.

2. A nozzle spray valve according to claim 1, wherein the nozzle (12) is tapered conically inwardly in the flow-through direction.

3. A nozzle spray valve according to claim 1, wherein the support (11) with the nozzle (12) is located completely within the housing (2).

4. A nozzle spray valve according to claim 1, wherein the support (11) with the nozzle (12) protrudes in a tubular manner beyond the second collar (6).

5. A nozzle spray valve according to claim 1, wherein the first collar (5) transforms at an inner edge (18) thereof into an axial ring (19) which extends against the flow through direction of the valve, the valve seat (9) being formed on the inner surface (7) by an edge area between the first collar (5) and the axial ring (19).

6. A nozzle spray valve according to claim 1, wherein a mouth (22) of the nozzle (12) is one of conical or rounded off.

7. A nozzle spray valve in combination with an internal combustion engine for oil cooling of pistons in the internal combustion engine, the nozzle spray valve including:

a one-piece housing manufactured from a deep drawn thin-walled material defining an interior cavity, the housing having an external surface, an internal surface, and first and second end walls, the first end wall having a first, radially inwardly directed collar with an inner surface which forms a first valve seat, the second end wall having a second, radially inwardly directed collar with an inner surface, the collars being produced by flanging inwardly at approximately right angles from a generally sleeve-shaped sidewall, a valve body positioned in the interior cavity, and a spring positioned between the valve body and a support located on the inner surface of the second collar such that the valve body is biased to a closed position against the first valve seat against a flow-through direction of the valve, the support being formed as one piece with a spray nozzle, the support is formed of plastic and includes an annular projection extending along the internal surface of housing, the annular projection has a second valve seat formed in an opening direction of the valve body, the annular projection including longitudinally extending segment-like openings or longitudinal recesses which extend at least over a majority of a length of the annular projection;

the-nozzle spray valve being mounted in the internal combustion engine with the spray nozzle being directed toward a piston to be cooled.

8. The combination of claim 7, wherein the spring has sufficient strength to bias the valve body to the closed position at low engine rpm's, and is compressed by oil pressure force at higher engine rpm's so that oil is sprayed through the spray nozzle and is directed at the piston to be cooled.

* * * * *